(12) United States Patent
Hohteri

(10) Patent No.: US 9,079,090 B2
(45) Date of Patent: Jul. 14, 2015

(54) SPORTS APPARATUS AND METHOD

(71) Applicant: Sstatzz Oy, Helsinki (FI)

(72) Inventor: Harri Hohteri, Helsinki (FI)

(73) Assignee: Sstatzz Oy, Helsinki (FI)

( * ) Notice: Subject to any disclaimer, the term of this patent is extended or adjusted under 35 U.S.C. 154(b) by 320 days.

(21) Appl. No.: 13/660,385

(22) Filed: Oct. 25, 2012

(65) Prior Publication Data

US 2014/0120960 A1 May 1, 2014

(51) Int. Cl.
*H04W 4/00* (2009.01)
*A63B 71/06* (2006.01)
(Continued)

(52) U.S. Cl.
CPC ......... *A63B 71/0605* (2013.01); *A63B 24/0021* (2013.01); *A63B 24/0062* (2013.01); *A63B 43/00* (2013.01); *G01S 13/34* (2013.01); *G01S 13/751* (2013.01); *G01S 13/82* (2013.01); *A63B 2024/0028* (2013.01);
(Continued)

(58) Field of Classification Search
CPC ............ G01S 5/22; G01S 5/20; G01S 3/808; G01S 3/8083; G01S 5/04; G01S 5/18; G01S 5/28; G01S 13/46; G01S 2013/466; H04W 64/00; H04W 24/00; H04W 48/08; H04W 84/12; H04W 4/22; H04W 4/021; H04W 24/02; H04W 4/02; H04W 4/025; H04W 4/043; H04W 64/003; H04W 72/0406; H04W 4/00; H04W 12/04; H04W 12/06

USPC ........ 455/456.1, 404.2, 456.3, 418, 419, 437, 455/438, 426.1, 452.1, 456.4, 456.5, 457, 455/553.1, 62, 68; 370/252, 329, 336, 328
See application file for complete search history.

(56) References Cited

U.S. PATENT DOCUMENTS 6,380,933 B1 4/2002 Sharir
6,950,123 B2 9/2005 Martins
(Continued)

FOREIGN PATENT DOCUMENTS

EP 2515548 A1 10/2012
WO 95/08816 A1 3/1995
(Continued)

OTHER PUBLICATIONS

Extended European Search Report, EP Application No. 13187645.0-1906, mailed Jan. 7, 2014.
(Continued)

*Primary Examiner* — Fred Casca
(74) *Attorney, Agent, or Firm* — Ziegler IP Law Group, LLC

(57) ABSTRACT

A sports apparatus is provided for monitoring movement of one or more projectiles associated with a sporting event. The apparatus includes a data processing system for processing sampled data signals generated in operation by one or more sensors (202, 204) included in the one or more projectiles. Moreover, the apparatus includes a mobile telephone coupled in wireless communication with the one or more projectiles for receiving the sampled data signals indicative of motion of the one or more projectiles. Furthermore, the mobile telephone is operable to execute one or more software products therein for analyzing the sampled data signals received at the mobile telephone for providing analysis results indicative of a nature of trajectory of the one or more projectiles.

9 Claims, 4 Drawing Sheets

(51) Int. Cl.
*A63B 24/00* (2006.01)
*A63B 43/00* (2006.01)
*G01S 13/34* (2006.01)
*G01S 13/75* (2006.01)
*G01S 13/82* (2006.01)

(52) U.S. Cl.
CPC .... *A63B 2024/0071* (2013.01); *A63B 2220/12* (2013.01); *A63B 2220/13* (2013.01); *A63B 2220/40* (2013.01); *A63B 2220/53* (2013.01); *A63B 2220/56* (2013.01); *A63B 2220/58* (2013.01); *A63B 2220/833* (2013.01); *A63B 2225/50* (2013.01); *A63B 2225/54* (2013.01); *A63B 2243/0004* (2013.01); *A63B 2243/005* (2013.01); *A63B 2243/007* (2013.01); *A63B 2243/0016* (2013.01); *A63B 2243/0025* (2013.01); *A63B 2243/0029* (2013.01); *A63B 2243/0041* (2013.01); *A63B 2243/0045* (2013.01); *A63B 2243/0066* (2013.01); *A63B 2243/0083* (2013.01)

(56) References Cited

U.S. PATENT DOCUMENTS

| | | |
|---|---|---|
| 7,499,077 B2 | 3/2009 | Li |
| 7,620,466 B2 | 11/2009 | Neale |
| 8,279,051 B2 | 10/2012 | Khan |
| 8,289,185 B2 | 10/2012 | Alonso |
| 2007/0135243 A1 | 6/2007 | LaRue |
| 2008/0089666 A1 | 4/2008 | Aman |
| 2008/0129825 A1 | 6/2008 | DeAngelis |
| 2008/0140233 A1 | 6/2008 | Seacat |
| 2008/0192116 A1 | 8/2008 | Tamir |
| 2009/0111582 A1 | 4/2009 | Schuler |
| 2009/0179805 A1* | 7/2009 | Roy et al. ............. 343/702 |
| 2009/0262137 A1 | 10/2009 | Walker |
| 2010/0030350 A1 | 2/2010 | House |
| 2010/0134614 A1 | 6/2010 | Aman |
| 2010/0173695 A1* | 7/2010 | Hutcheson et al. ........... 463/23 |
| 2010/0283630 A1* | 11/2010 | Alonso ............. 340/870.11 |
| 2011/0071792 A1 | 3/2011 | Miner |
| 2011/0105226 A1 | 5/2011 | Perlman |
| 2011/0194730 A1 | 8/2011 | Rhoads |
| 2011/0304497 A1 | 12/2011 | Molyneux |
| 2012/0001728 A1* | 1/2012 | Janiszewski ............ 340/8.1 |
| 2012/0058845 A1 | 3/2012 | Crowley et al. |
| 2012/0271440 A1 | 10/2012 | Lunner |
| 2012/0293115 A1* | 11/2012 | Ramsesh ............. 320/108 |

FOREIGN PATENT DOCUMENTS

| | | |
|---|---|---|
| WO | 99/57900 A1 | 11/1999 |
| WO | 02/09833 A1 | 2/2002 |

OTHER PUBLICATIONS

Anonymous: "GPS tracking Unit—Wikipedia, the free encyclopedia", Apr. 5, 2013, XP055140038, retrieved from the internet: URL:http://en.wikipedia.org/w/index.php?title=GPS_tracking_unit&oldid=54887452 [retrieved on Sep. 15, 2014], 6 pages.
Extended European Search Report; EP App. No. 14162990.7; dated Oct. 9, 2014, 9 pages.

* cited by examiner

SPORTS APPARATUS AND METHOD

BACKGROUND

1. Field

The aspects of the present disclosure generally relate to a sports apparatus, for example to sports apparatus including one or more projectiles, for example one or more balls, wherein the projectiles include one or more sensors and a wireless communication interface, and a data processing arrangement also equipped with a wireless interface, for example implemented via a smart phone and/or a personal computer and/or a remote server with data processing functionality, wherein the one or more sensors of the one or more projectiles provide sensor signals indicative of movements of the one or more projectiles, wherein the sensor signals are communicated to the data processing arrangement for analysis and recording. Moreover, the present disclosure relates to methods of operating aforesaid sports apparatus for recording movement of the one or more projectiles for subsequent analysis and reporting. Furthermore, the present disclosure relates to software products recorded on machine-readable data storage media, wherein the software products are executable upon computing hardware for implementing aforesaid methods.

2. Brief Description of Related Developments

It is well known to track movement of one or more projectiles, for example one or more balls, utilized when playing a sports game, for example football or basket ball, to determine statistical information relating to the sports game. Such statistical information can include a number of goals or points scored, and performance of one or more players of the sports game. Such tracking has often been implemented using cameras, personnel collating statistics manually as well as using sensors included in the one or more projectiles. However, known approaches for analysing movement of the one or more projectiles are not well developed, such that inadequate analysis of sports games utilizing the one or more projectiles is not presently achievable.

In a published US patent application no. US2012/058845A1, there is described a basketball which incorporates motion sensors. The motion sensors include, for example, one or more accelerometers, one or more angular rate gyroscopic sensors and one or more magnetometers. In the application, it is elucidated that sensor signals from the motion sensors can be analyzed to generate statistical results, but the application is devoid of detail of how the statistical analysis can be performed in practice.

There arises therefore a problem that known apparatus for providing analysis of trajectories of one or more projectiles associated with sports events are not sufficiently evolved and do not provided statistical analysis to a fullest extent which is potentially feasible to achieve.

SUMMARY

The present disclosure provides an improved sports apparatus, wherein movements of one or more projectiles employed in sports activities are more fully analyzed using the sports apparatus.

The present disclosure provides an improved method of using sports apparatus, wherein the method is capable of analyzing movements of one or more projectiles employed in sports activities more fully analyzed using the sports apparatus.

In one aspect, the present disclosure provides a sports apparatus for monitoring movement of one or more projectiles associated with a sporting event. The sports apparatus includes a data processing system for processing sampled data signals generated in operation by one or more sensors included in the one or more projectiles. The apparatus includes a mobile telephone coupled in wireless communication with the one or more projectiles for receiving the sampled data signals indicative of motion of the one or more projectiles, wherein the mobile telephone is operable to execute one or more software products therein for analyzing the sampled data signals received at the mobile telephone for providing analysis results indicative of a nature of trajectory of the one or more projectiles.

The mobile telephone executing the one or more software products is capable of providing more full analysis of movements of the one or more projectiles.

In another aspect, the present disclosure provides a method of using a sports apparatus for monitoring movement of one or more projectiles associated with a sporting event. The method involves using a mobile telephone coupled in wireless communication with the one or more projectiles for receiving the sampled data signals indicative of motion of the one or more projectiles; and using the mobile telephone to execute one or more software products therein for analyzing the sampled data signals received at the mobile telephone for providing analysis results indicative of a nature of trajectory of the one or more projectiles.

In another aspect, the present disclosure provides a software product recorded on machine-readable data storage media. The software product is executable upon computing hardware for implementing a method pursuant to the method of the present disclosure.

It will be appreciated that features of the invention are susceptible to being combined in various combinations without departing from the scope of the invention as defined by the appended claims.

BRIEF DESCRIPTION OF THE DRAWINGS

Embodiments of the present disclosure will now be described, by way of example only, with reference to the following diagrams wherein.

In the accompanying diagrams, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF ILLUSTRATIVE EMBODIMENTS

The following detailed description discloses aspects of the claimed invention and the ways it can be implemented. However, the description is not intended to define or limit the invention, such definition or limitation being solely contained in the claims appended thereto. Although the best mode of carrying out the invention has been disclosed comprehensively, those in the art would recognize that other embodiments for carrying out or practicing the invention are also possible.

In overview, the present disclosure relates to a sports apparatus for use at a sporting event, wherein the sports apparatus comprises one or more projectiles, for example balls, discus, shuttlecock or similar, and a data processing arrangement for receiving wireless transmissions from the one or more projectiles indicative of movement of the one or more projectiles, wherein the data processing arrangement is operable to receive the wireless transmissions from the one or more projectiles and generate various types of statistical analysis results which enable performance at the sporting event to be assessed and/or recorded.

Figure 1:
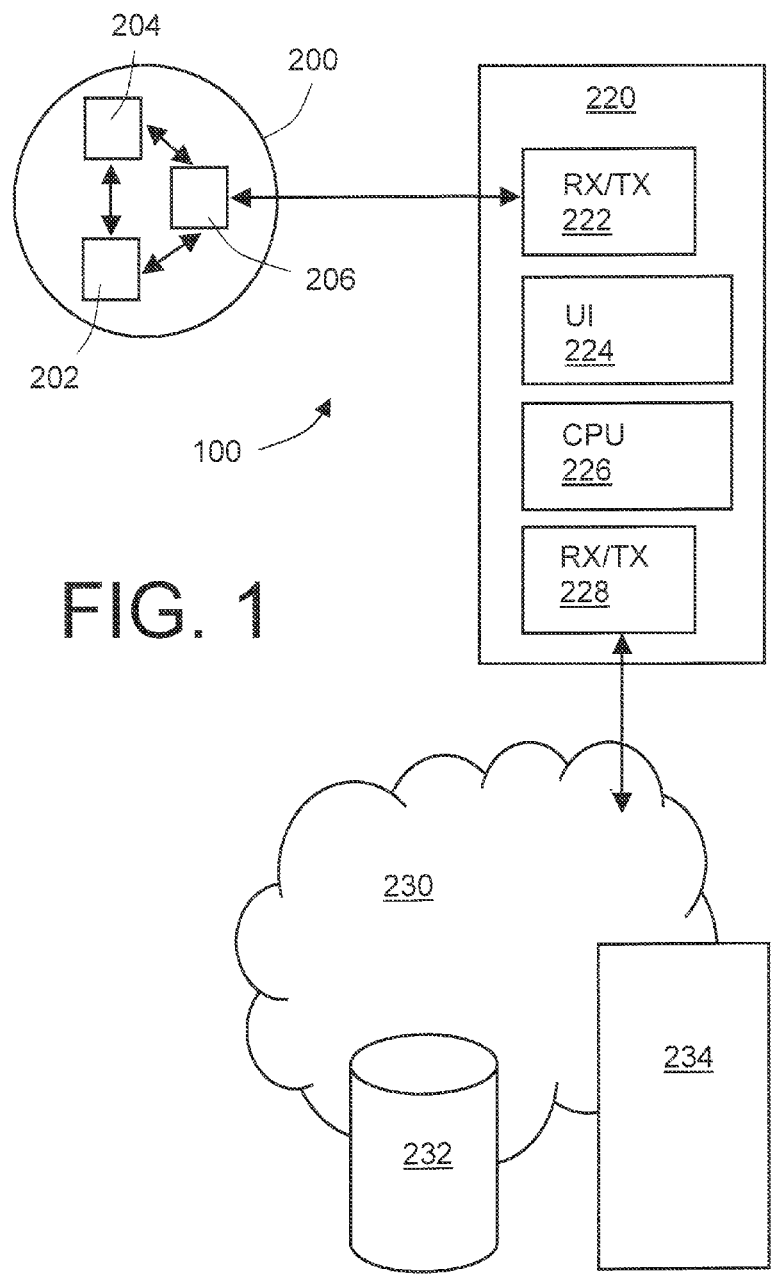
FIG. 1 is a schematic illustration of an example embodiment of a sports apparatus in accordance with the present disclosure.

The sports apparatus, indicated generally by 100 in FIG. 1, will now be described. Referring to FIG. 1, the apparatus 100 includes at least one projectile 200, for example a basket ball. During the sporting event, the projectile 200 is acted upon by one or more human participants at the sporting event, as well as bouncing on a ground surface and one or more sports structure, for example basketball nets and associated back walls. The projectile 200 includes within its outer protective layer one or more sensors 204, for example one or more accelerometers, one or more gyroscopic sensors, one or more magnetometers, for recording motion, rotation, spin, and acceleration experienced by the projectile 200 in use. Optionally, the projectile 200, for example a ball, includes location transducers 202, for example a radio beacon arrangement, for sending signals to base stations for position measurement purposes, for example by triangulation based on received wireless signal strength at the radio beacon arrangement; alternatively, or additionally time-of-flight of transmitted pulse radio signals from the projectile 200 is employed by the apparatus 100 for determining an instantaneous spatial position of the projectile 200 within a given playing area associated with the sporting event. Optionally, the location transducers 202 also include a GPS receiver for determining a spatial position of the projectile from Earth-orbiting position reference satellites; such position determination is, for example, beneficial when the projectile 200 is implemented as a golf ball, wherein the sporting event is a golf tournament being executed over a spatially extensive golfing range. The projectile 200 also includes a wireless interface 206 for communicating sampled sensor signals from the one or more sensors 204, and optionally the location transducers 202 to a wireless receiving location remote from the projectile 200. Optionally, the projectile 200 includes a miniaturized server arrangement, for enabling the projectile 200 to be accessed conveniently using hypertext transport protocol (HTTP) communications.

The sports apparatus 100 further includes a mobile telephone 220, also known as a cell phone. Beneficially, the mobile telephone 220 is a smart phone with sufficient computational power in its central processing unit 226 to perform analysis of movements of the projectile 200 and determine its spatial location. The mobile telephone 220 includes a user interface 224 for presenting statistical analysis results from processing data communicated from the projectile 200 to the mobile telephone 220 via a wireless interface 222 of the mobile telephone 220. Moreover, the smart telephone 220 includes a smart wireless interface 228 for enabling the mobile telephone 220 to communicate via the Internet or similar data communication network to a server system 234 and/or to a remote database 232. Optionally, the apparatus 100 is operable to function with data exchanges occurring directly between the server system 234 and the remote database 232 when performing statistical analysis of sensor signals generated during motion of the projectile 200.

Examples of methods of use of the apparatus 100 will now be described. In a first example, the mobile telephone 220 sends information after each sports practice session, for example to Facebook ("Facebook" is a registered trade mark), namely an athlete using the apparatus 100 is able to share statistical analysis results generated by the apparatus 100 within a social network, for example for competitively improving individual sports performance. Optionally, the mobile telephone 220 is beneficially configurable to send a tweet every time the athlete makes a successful shot of the projectile 200.

In a second example, the mobile telephone 220 is operable to send one or more status updates to a social network each time the athlete is able to make a three-point shot of the projectile 200, namely able to score from a long distance behind a three-point line during the sporting event. In addition to third-party services such as Facebook andor Twitter ("Twitter" is a registered trade mark, associated with the "Twittersphere"), analytical statistical results generated by the system 100 can be sent to any specified service hosted on the Internet. Optionally, the results can be public or restricted, for example for personal use or for use by a dedicated group, for example a sports coach or other members of a specified team of athletes.

Figure 2:
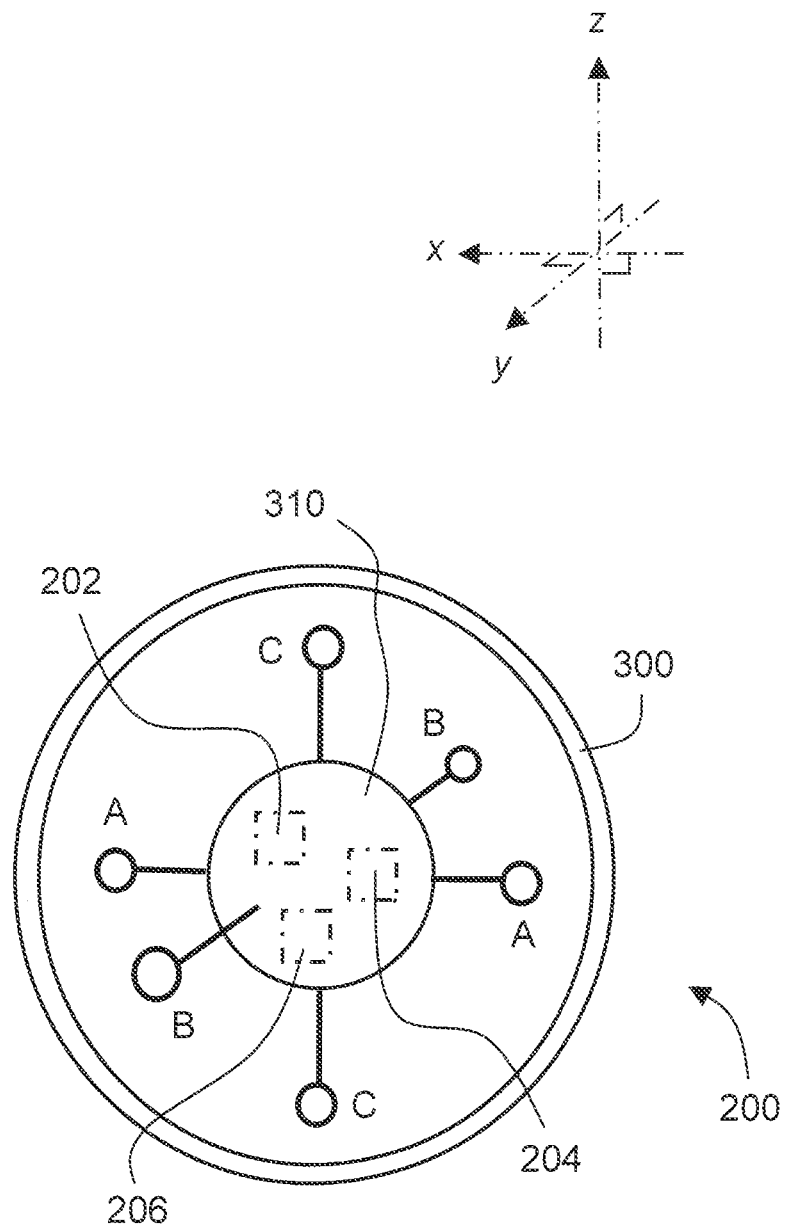
FIG. 2 is a schematic illustration of an implementation of a projectile of the sports apparatus of FIG. 1.

Referring next to FIG. 2, an example implementation of the projectile 200 is shown. The projectile 200 has an outer region 300, for example fabricated from an elastically deformable material, and a central armoured core 310 for accommodating the one or more sensors 204, the wireless interface 206, and optionally the location transducers 202. Beneficially, the wireless interface 206 is implemented as three sets of dipoles A-A, B-B, C-C which are individually excitable by the wireless interface 206; the dipoles are beneficially implemented in an orthogonal manner along three Cartesian x, y, z axes as shown. When communicating data, the wireless interface 206 sends data via the three dipoles which are excited at mutually different carrier-signal frequencies, such that the projectile 200 is capable of providing a pseudo-omnidirectional wireless emission polar pattern which avoids data dropout as the projectile 200 moves in use, for example rotates, and thus allows for more accurate position determination based upon received wireless signal strength from wireless emission from the projectile 200. Optionally, batteries of the projectile 200 are recharged by wireless inductive charging when the projectile 200 is not in use, for example in a storage unit overnight, thereby enabling the outer region 300 of the projectile 200 to be hermetically sealed, for example to avoid water ingress into the central armoured core 310 when the projectile 200 is in use in adverse weather conditions. Sensors might be charged also by using internal power generator taking energy from the movement of the ball. Example of such power generator can be kinetic power generator. Additional examples of power generation for the sensors might include solar cells etc. . . . Sensor(s) in sporting equipment can be installed in the cover or inside of the sporting event. For example in golf ball the sensor can be in the middle of the golf ball i.e. embedded in the structure. If sporting event is for example football (used in American football) there might be more than one sensor for example two i.e. one in both ends. This would enable more accurate analysis.

Software products recorded on machine-readable data storage media and executable upon computing hardware of the apparatus 100 are employed for analyzing movements of the projectile 200. Such analysis is optionally based upon classical physics, for example according to Newtonian Laws of motion. Alternatively, such analysis is based upon other computational techniques that will be described later.

A problem encountered when analyzing trajectories of the projectile 200 based upon classical physics is that such analysis requires a considerable number of data samples recording movements of the projectile 200 to be communicated; this is especially pertinent when the projectile 200 is subject to rapid movements, for example bouncing within a confined space wherein the projectile 200 rapidly changes its direction of motion.

Optionally, a volume of data needing to be communicated from the projectile 200 via its wireless interface 206 is susceptible to being reduced by computing hardware, for example a PIC micropower microcontroller or similar, included in the core 310 collecting sensor data at a high rate, for example at a 1 kHz sampling rate or higher, and then processing the sampled sensor data to determine whether or not changes in the sampled sensor data are greater than a defined threshold for at least M samples, wherein M is an integer greater than unity; in an event that changes in sensor data are less than the threshold during the M samples, no data is communicated from the projectile 200 to the mobile telephone 220. Optionally, the projectile 200 includes a data buffer for storing sampled sensor data for coping with a situation where the projectile 200 is subject to a long sustained period of rapid changes in motion.

Additionally in order to save power the sending of data can be tricked to take place only when there is movement of the sporting equipment. In general the sending of data from the sporting equipment sensors can be continuous, burst mode (i.e. sending buffered data) pull based (i.e. mobile phone requests the data) or push based i.e. sensor sends as unicast, multicast or broadcast the data to one or more receiving mobile phones or other stations. In some embodiments the sensors can perform calculations in the sporting event and send all or some of the data in analysed format to receivers or the service.

Figure 3:
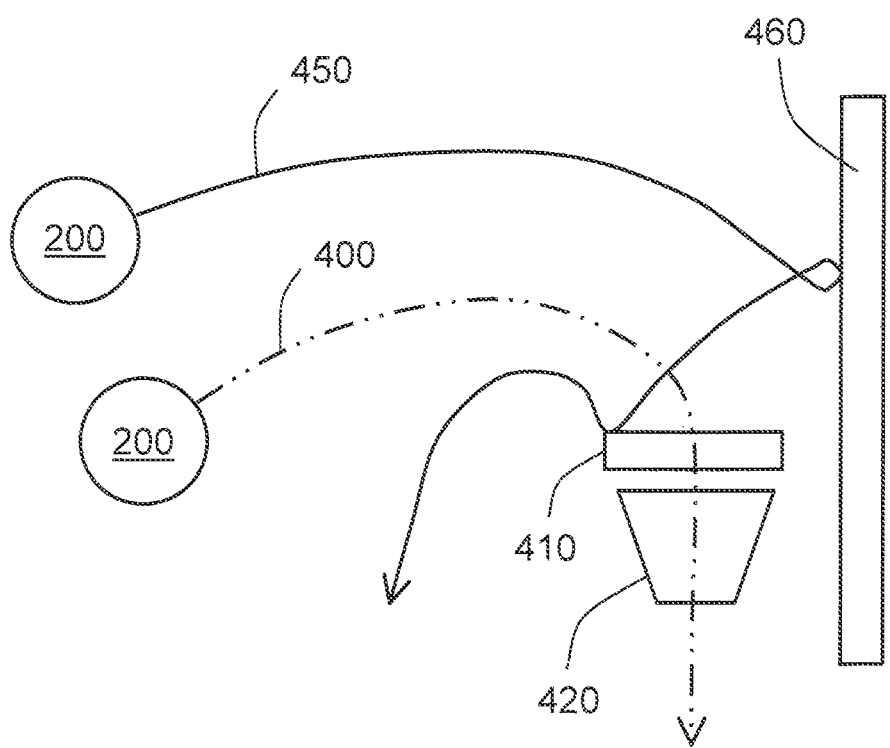
FIG. 3 is an illustration of a projectile path associated with the system of FIG. 1.

Referring to FIG. 3, a set of example trajectories of the projectile 200, for example a basketball ball, is illustrated. A first trajectory 400 of the projectile 200 follows an ideal path to pass centrally past a basketball net rim 410 and down through its associated net 420, without the projectile 200 being rapidly laterally displaced or its rotation characteristic being temporally abruptly altered. A second trajectory 450 of the projectile 200 follows a more complex path to a back wall 460 whereat the projectile 200 impacts and bounces back to hit the basketball net rim 410 to bounce subsequently therefrom away from the net 420. Motions of the projectile 200 as sensed by the projectile 200 for the first and second trajectories 400, 450 are radically different and are susceptible, for example, to being each recognized by a neural network algorithm executing on a least one of the mobile telephone 220 and the server system 234. Beneficially, most of the neural network processing is performed on the mobile telephone 220 for reducing a volume of data needing to be communicated from the mobile telephone 220 to the server system 234, thereby conserving wireless communication bandwidth resources. Additionally sensor(s) in a sporting equipment can also include magnetometer or similar to recognize change in magnetic field. This is beneficial for detecting for example if a basket ball goes thru basketball net rim 410.

Figure 4:
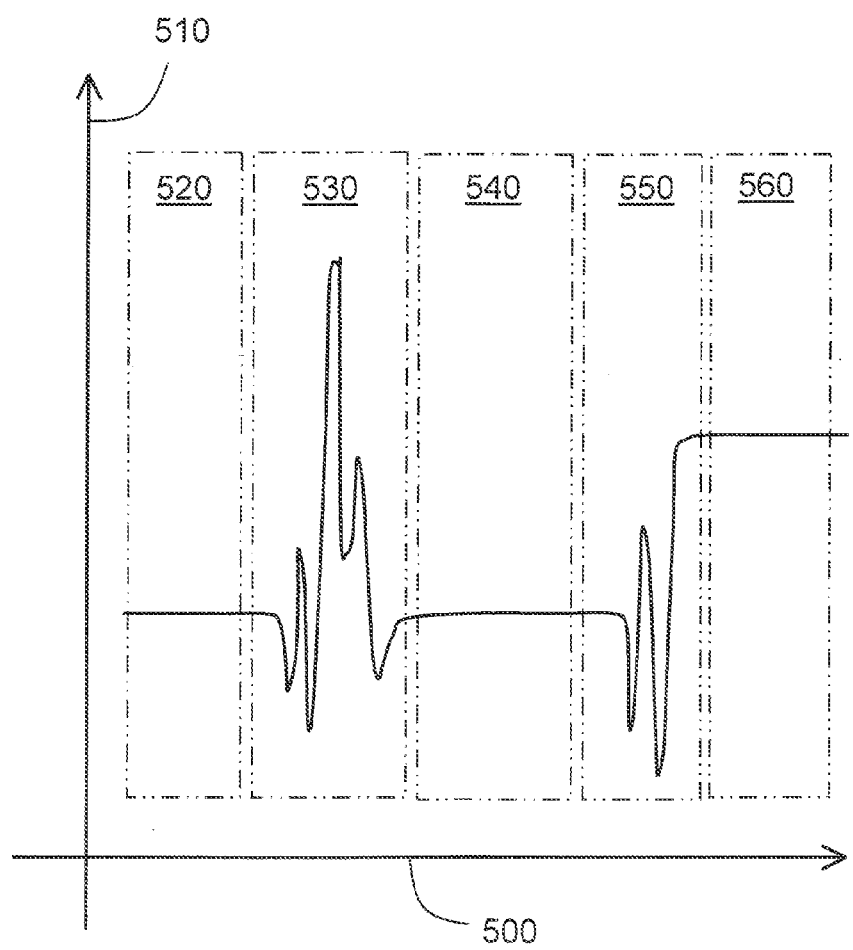
FIG. 4 is an illustration of example movement signals associated with a projectile of the system of FIG. 1.

Referring the FIG. 4, sampled sensors signals corresponding to the aforesaid second trajectory 450 are shown. In FIG. 4, an abscissa axis 500 denotes a passage of time from left to right, and an ordinate axis 510 denotes samples sensor signal value. A first portion 520 of the trajectory 450 has relatively small changes in sampled sensor data, whereas bouncing from the back wall 460 results in rapidly changing data in a second portion 530. A third portion 540 of the trajectory 450 between the back wall 460 and basketball net rim 410 has associated therewith relatively little change in sample sensor data from the projectile 200, whereas the bounce outward from the basketball net rim 410 results in a fourth portion 550 of the trajectory 450 with rapid changes. Finally, a fifth portion 560 of the trajectory 450 where the projectile 200 is bouncing outwardly away from the basketball net rim 410 has relatively slowly changing sampled sensor data associated therewith.

The aforementioned neural network software, for example downloaded to the mobile telephone 220 as a software application, for example from an "App Store", is beneficially trained to recognize different patterns of movement of the projectile 200 during the sporting event. For example, the projectile 200, for example a basketball ball, is shot towards a central opening of the basketball net rim 410 for N times, and a user interface (UI), for example a touch screen, of the mobile telephone 220 is used to inform the neural network software whether or not the shot was successful, namely passed correctly through the net 420. Moreover, the neural network software is also informed via the user interface (UI) if the shot were a normal shot or three-point shot. After a series of such learning exercises, the neural network software is capable of resulting in the mobile telephone 220 being able to recognize immediately what type of shot has been executed for the projectile 200. Optionally, learning parameters for the neural network software can be pre-loaded into the mobile telephone 220, thereby avoiding a need for aforesaid training, for example in an event that sensor characteristics of the projectile 200 are known beforehand, for example the projectile 200 is a mass-produced proprietary product. Optionally, users are able to share their neural network software training parameters with other users of the apparatus 100.

The apparatus 100 is capable of being employed in a wide range of sports, for example bowling, tennis, football, rugby, basketball, baseball, cricket, water polo, but not limited thereto. By the mobile telephone 220, it is meant one or more of communication devices such as: telephones, personal data assistants (PDA's) provided with wireless interfaces, tablet computers provided wireless interfaces, but not limited thereto.

Modifications to embodiments of the invention described in the foregoing are possible without departing from the scope of the invention as defined by the accompanying claims. Expressions such as "including", "comprising", "incorporating", "consisting of", "have", "is" used to describe the present invention are intended to be construed in a non-exclusive manner, namely allowing for items, components or elements not explicitly described also to be present. Reference to the singular is also to be construed to relate to the plural.

I claim:

1. A sports apparatus for monitoring movement of one or more projectiles associated with a sporting event, comprising:
   a data processing system for processing sampled data signals generated in operation by one or more sensors included in the one or more projectiles; and
   a mobile telephone coupled in wireless communication with the one or more projectiles for receiving the sampled data signals indicative of motion of the one or more projectiles, wherein the mobile telephone is operable to execute one or more software products therein, including a neural network software product for analyzing the sampled data signals received at the mobile telephone based on projectile movement learning exercises applied to the neural network software product for providing analysis results indicative of a nature of trajectory of the one or more projectiles, a server arrangement which is remote from the mobile telephone, wherein the mobile telephone is couplable in communication with the server arrangement for communicating analysis data thereto and/or receiving analysis parameters therefrom, wherein the mobile telephone is operable to provide a user interface via which the one or more software products are user programmable to identify from the sample data signals a nature of trajectory of the one or more projectiles, wherein the one or more projectiles include a data processing arrangement for analyzing the sampled data signals and for sending the sampled data signals when an amplitude of change in the sample data signals exceeds a predefined threshold for more than a predefined period.

2. The sports apparatus as claimed in claim 1, further comprising a wireless beacon detection arrangement for determining one or more spatial locations of the one or more projectiles when in use.

3. The sports apparatus as claimed in claim 2, wherein the one or more projectiles include a pseudo-omnidirectional antenna arrangement for emitting wireless radiation therefrom for receipt at the mobile telephone.

4. The sports apparatus as claimed in claim 1, wherein the apparatus supports multiple users and is operable to provide sharing between the users of at least one of: analysis results pertaining to trajectories of the one or more projectiles, neural network learning parameters for recognizing types of trajectory of the one or more projectiles.

5. A method of using a sports apparatus for monitoring movement of one or more projectiles associated with a sporting event, wherein the apparatus includes a data processing system for processing sampled data signals generated in operation by one or more sensors included in the one or more projectiles, the method comprising:

using a mobile telephone coupled in wireless communication with the one or more projectiles for receiving the sampled data signals indicative of motion of the one or more projectiles; and using the mobile telephone to execute one or more software products therein, including a neural network software product for analyzing the sampled data signals received at the mobile telephone based on projectile movement learning exercises applied to the neural network software product for providing analysis results indicative of a nature of trajectory of the one or more projectiles, using a server arrangement which is remote from the mobile telephone, wherein the mobile telephone is couplable in communication with the server arrangement for communicating analysis data thereto and/or receiving analysis parameters therefrom, using the mobile telephone to provide a user interface via which the one or more software products are user programmable to identify from the sample data signals a nature of trajectory of the one or more projectiles, arranging for the one or more projectiles to include a data processing arrangement for analyzing the sampled data signals and for sending the sampled data signals when an amplitude of change in the sample data signals exceeds a predefined threshold for more than a predefined period.

6. The method as claimed in claim 5, further comprising using a wireless beacon detection arrangement for determining one or more spatial locations of the one or more projectiles when in use.

7. The method as claimed in claim 6, further comprising arranging for one or more projectiles to include a pseudo-omnidirectional antenna arrangement for emitting wireless radiation therefrom for receipt at the mobile telephone.

8. The method as claimed in claim 5, further comprising arranging for the apparatus to support multiple users for providing sharing between the users of at least one of: analysis results pertaining to trajectories of the one or more projectiles, neural network learning parameters for recognizing types of trajectory of the one or more projectiles.

9. A non-transitory machine-readable data storage media encoded with a software product, wherein the software product is executable upon computing hardware for implementing the method as claimed in claim 5.

* * * * *